(12) United States Patent
Yeh

(10) Patent No.: US 9,353,872 B1
(45) Date of Patent: May 31, 2016

(54) MONITOR VALVE

(71) Applicant: Liang-Yu Yeh, Changhua County (TW)

(72) Inventor: Liang-Yu Yeh, Changhua County (TW)

( * ) Notice: Subject to any disclaimer, the term of this patent is extended or adjusted under 35 U.S.C. 154(b) by 0 days.

(21) Appl. No.: 14/699,348

(22) Filed: Apr. 29, 2015

(51) Int. Cl.
*F16K 47/08* (2006.01)
*F16K 5/06* (2006.01)
*F16K 37/00* (2006.01)

(52) U.S. Cl.
CPC .. *F16K 5/06* (2013.01); *F16K 37/00* (2013.01)

(58) Field of Classification Search
USPC .................................. 37/625.31, 625.32, 559
See application file for complete search history.

(56) References Cited

U.S. PATENT DOCUMENTS

| | | | | |
|---|---|---|---|---|
| 4,643,224 A | * | 2/1987 | Rung | A62C 37/50 116/276 |
| 5,311,897 A | * | 5/1994 | Greer | F16K 5/10 137/15.22 |
| 5,687,755 A | * | 11/1997 | Farquhar | B01D 5/009 137/182 |
| 8,365,766 B2 | * | 2/2013 | Wang | F16K 5/0605 137/556.6 |
| 8,366,070 B2 | * | 2/2013 | Rimboym | F16K 5/0605 137/625.31 |
| 8,881,767 B2 | * | 11/2014 | Bartell | F16K 11/0873 137/625.32 |

* cited by examiner

*Primary Examiner* — John Fox

(57) ABSTRACT

A monitor valve contains: a body, at least one monitoring assembly, a stop ball, an inlet connector, and a transmission device. The body is hollow and includes an inlet channel, an outlet channel, at least one orifice, a chamber, a neck opening, a plurality of trenches, and a first hole. The at least one monitoring assembly is mounted in the at least one orifice of the body. The stop ball is accommodated in the chamber of the body and includes a first close ring, a first aperture, and two second apertures. The inlet connector is locked in the inlet channel of the body and includes a guiding portion, a second close ring. The guiding portion has a central passage and plural passages, and each passage has an inlet. The transmission device is rotatably fixed in the first hole of the body to control the stop ball to rotate.

13 Claims, 14 Drawing Sheets

MONITOR VALVE

FIELD OF THE INVENTION

The present invention relates to a water valve, and more particularly to a monitor valve which lowers flowing noises and flows fluid smoothly at a large flow.

BACKGROUND OF THE INVENTION

A conventional monitor valve contains a body, the body includes a transmission assembly for controlling a stop ball to rotate, thus controlling and monitoring a flow of fluid. However, when the fluid flows into the monitor valve, a pressure difference and turbulence flowing cause, because a guiding structure was not arranged between the stop ball and the inlet connector. Furthermore, flowing noises and lower flow produce.

The present invention has arisen to mitigate and/or obviate the afore-described disadvantages.

SUMMARY OF THE INVENTION

The primary objective of the present invention is to provide a monitor valve which lowers flowing noises and flows fluid smoothly at a large flow.

To obtain the above objective, a monitor valve provided by the present invention contains: a body, at least one monitoring assembly, a stop ball, an inlet connector, and a transmission device.

The body is hollow and includes an inlet channel defined on a first end thereof, an outlet channel formed on a second end thereof, at least one orifice arranged on at least one side thereof adjacent to the outlet channel, a chamber defined between the at least one orifice and the inlet channel, a neck opening defined between the chamber and the at least one orifice, a plurality of trenches arranged around a peripheral side of the chamber, and a first hole formed on the body opposite to the chamber.

The at least one monitoring assembly is mounted in the at least one orifice of the body.

The stop ball is accommodated in the chamber of the body and includes a first close ring disposed between the stop ball and the neck opening, and a first aperture and two second apertures which are formed on three positions of the stop ball, wherein the first aperture is in communication with and is perpendicular to the two second apertures.

The inlet connector is locked in the inlet channel of the body and includes a guiding portion formed on one end of the inlet connector and accommodated in the chamber of the body, the inlet connector also includes a second close ring defined between the guiding portion and the stop ball, wherein the guiding portion has a central passage formed therein and has plural passages arranged around a peripheral side of the guiding portion, and wherein each passage has an inlet formed thereon.

The transmission device is rotatably fixed in the first hole of the body to control the stop ball to rotate.

In one embodiment, two orifices are arranged on two sides of the body adjacent to the outlet channel.

In one embodiment, each monitoring assembly includes a first screw nut screwing with each of the at least one orifice and includes a window fixed in the first screw nut of the body.

In one embodiment, each monitoring assembly also includes a closing washer fixed between each of the two orifices and the first screw nut.

In one embodiment, two diameters of the two second apertures are different.

In one embodiment, the stop ball also includes a recess defined thereon to correspond to the first hole, and the transmission device includes a handle bar, a disc, and a control shaft, wherein the control shaft is rotatably fixed in the first hole of the body and has an extension and a bolt formed on one end of the extension and mounted in the recess of the stop ball, and the extension extends out of the body; the disc is disposed on the body and includes a through hole defined therein to insert through the extension; the handle bar is placed on the disc and has a coupling segment and a griping segment, wherein the coupling segment has a limiting orifice, and the extension of the control shaft inserts through limiting orifice of the handle bar and the through hole of the disc, and the extension is connected with the handle bar, such that the handle bar drives the control shaft to rotate.

In one embodiment, the transmission device further includes a positioning set, and the disc also has at least three fixing portions which are separated a radius distance from the through hole and are spaced from one another, and each fixing portion is a notch or a hole, the coupling segment of the handle bar has an affix orifice, wherein the positioning set is secured between the affix orifice of the handle bar and one of the at least three fixing portions, and the positioning set has a spring holder, a resilient element, and a rolling ball, wherein the spring holder is disposed in the affix orifice and accommodates the resilient element which abuts against the rolling ball, such that the rolling ball is partially accommodated in and is biased against the one of the at least three fixing portions.

In one embodiment, a second screw nut of the transmission device is screwed with the extension of the control shaft via the handle bar.

In one embodiment, the guiding portion has seven or five passages isometrically arranged around the peripheral side thereof In one embodiment, each passage is arcuate or rectangular.

DETAILED DESCRIPTION OF THE PREFERRED EMBODIMENTS

Figure 1:
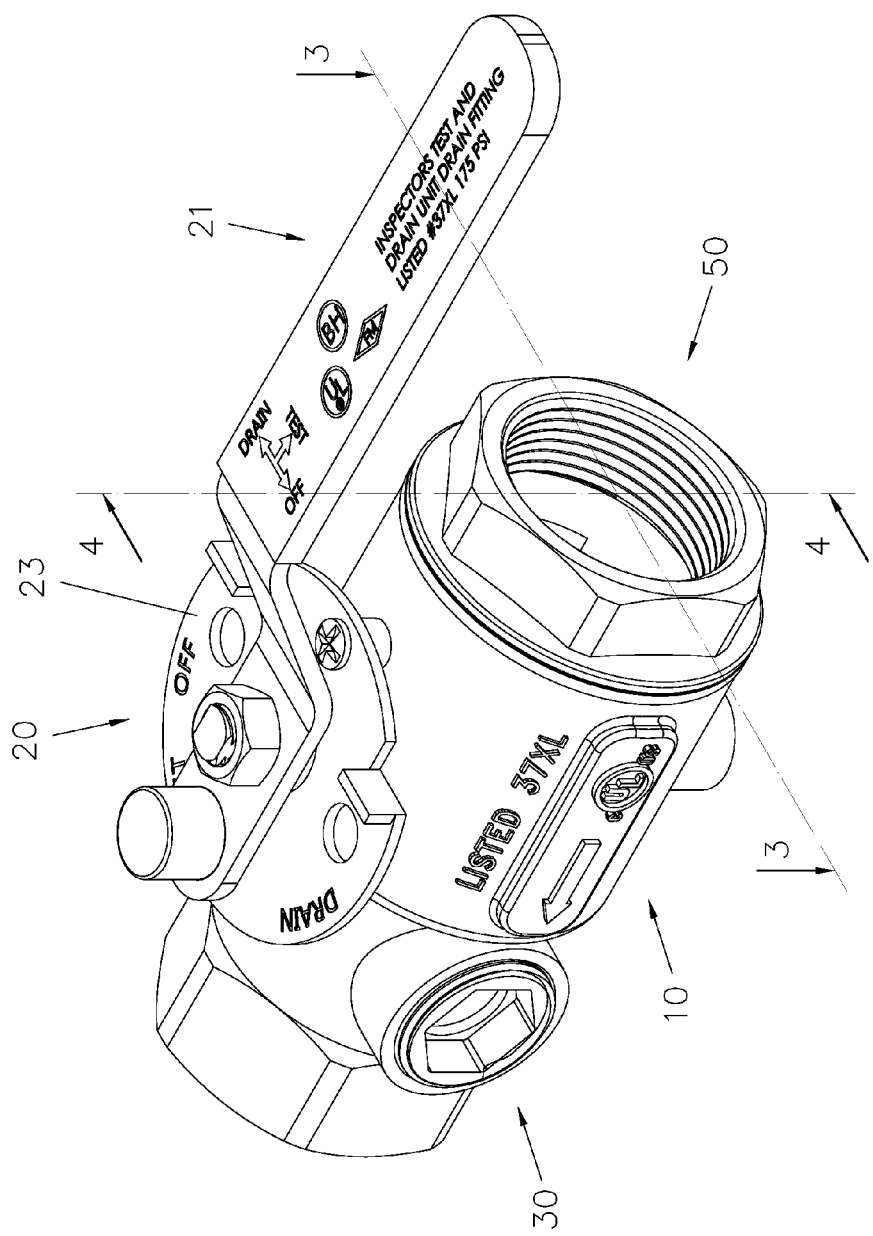
FIG. 1 is a perspective view showing the assembly of a monitor valve according to a first embodiment of the present invention.
Figure 2:
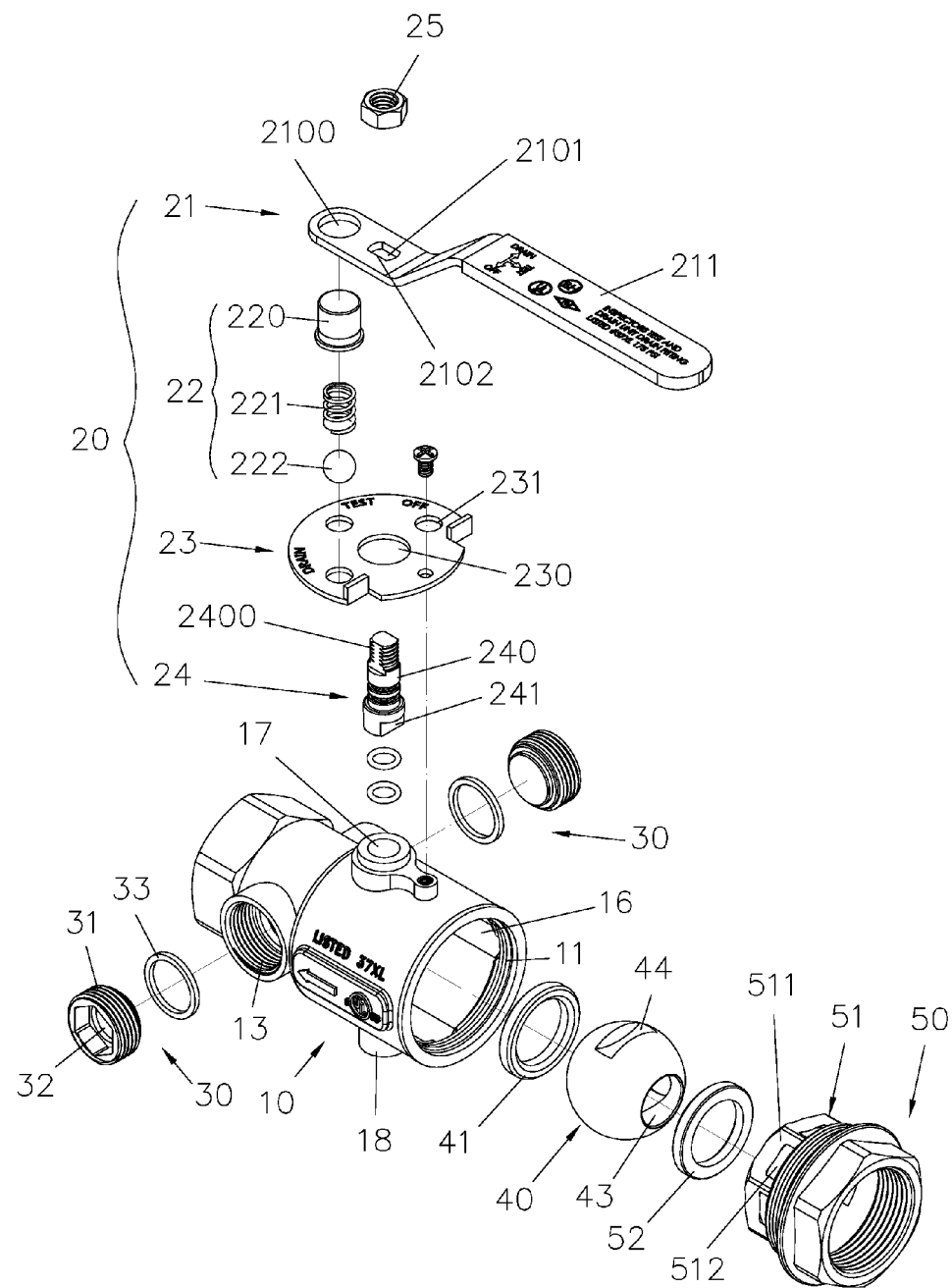
FIG. 2 is a perspective view showing the exploded components of the monitor valve according to the first embodiment of the present invention.
Figure 3:
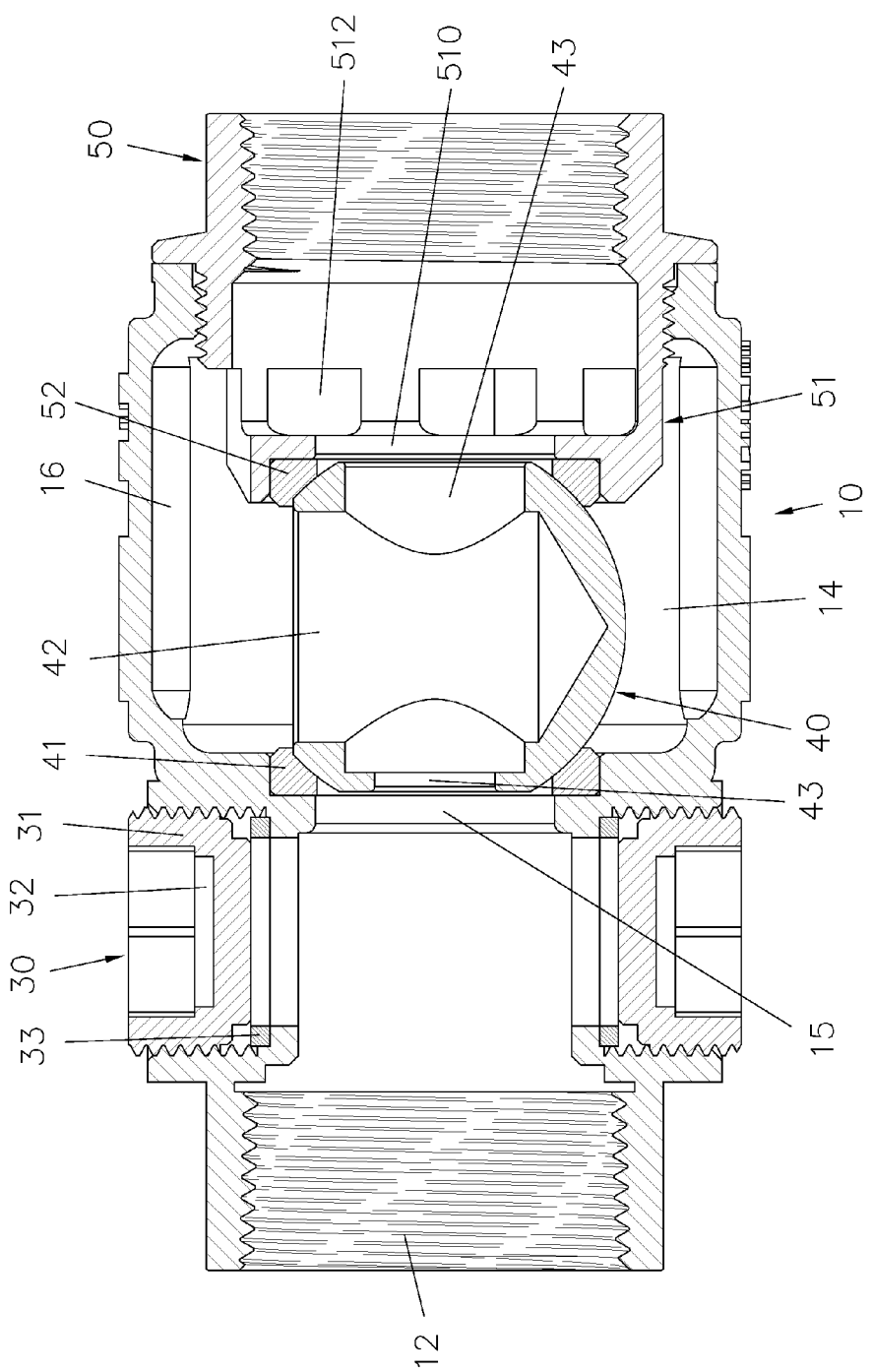
FIG. 3 is a cross sectional view taken along the line 3-3 of FIG. 1.

As shown in FIGS. 1 to 4, a monitor valve according to a first embodiment of the present invention comprises: a body 10, a transmission device 20, at least one monitoring assembly 30, a stop ball 40, and an inlet connector 50.

Figure 5:
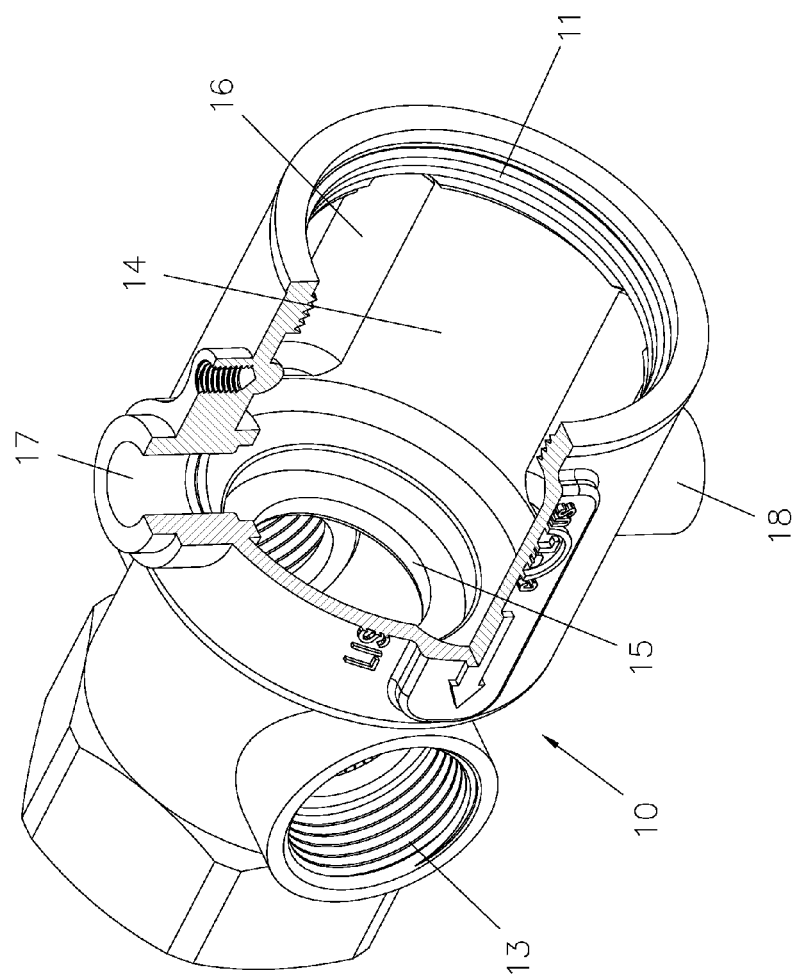
FIG. 5 is a cross-sectional perspective view of a part of a body of the monitor valve according to the first embodiment of the present invention.

Referring to FIG. 5, the body 10 is hollow and includes an inlet channel 11 defined on a first end thereof, an outlet channel 12 formed on a second end thereof, and at least one orifice 13 arranged on at least one side thereof adjacent to the outlet channel 12. In this embodiment, two orifices 13 are arranged on two sides of the body 10 adjacent to the outlet channel 12. The body 10 also includes a chamber 14 defined among the two orifices 13 and the inlet channel 11, a neck opening 15 defined among the chamber 14 and the two orifices 13, and a plurality of trenches 16 arranged around a peripheral side of the chamber 14, a first hole 17 formed on the body 10 opposite to the chamber 14, and a second hole 18 lactated opposite to the first hole 17 and locking with a pressure valve (not shown).

Two monitoring assemblies 30 are mounted in the two orifices 13 of the body 10, and each monitoring assembly 30 includes a first screw nut 31 screwing with each of the two orifices 13 and includes a window 32 fixed in the first screw nut 31, such that a user sees a flowing of fluid in the body 10 through the window 32. Each monitoring assembly 30 also includes a closing washer 33 fixed between each of the two orifices 13 and the first screw nut 31, wherein the first screw nut 31 and the window 32 are two independent components or are one-piece formed.

The stop ball 40 is accommodated in the chamber 14 of the body 10 and includes a first close ring 41 disposed between the stop ball 40 and the neck opening 15, a first aperture 42 and two second apertures 43 which are formed on three positions of the stop ball 40, wherein the first aperture 42 is in communication with and is perpendicular to the two second apertures 43, and two diameters of the two second apertures 43 are different. The stop ball 40 also includes a recess 44 defined thereon to correspond to the first hole 17.

Figure 6:
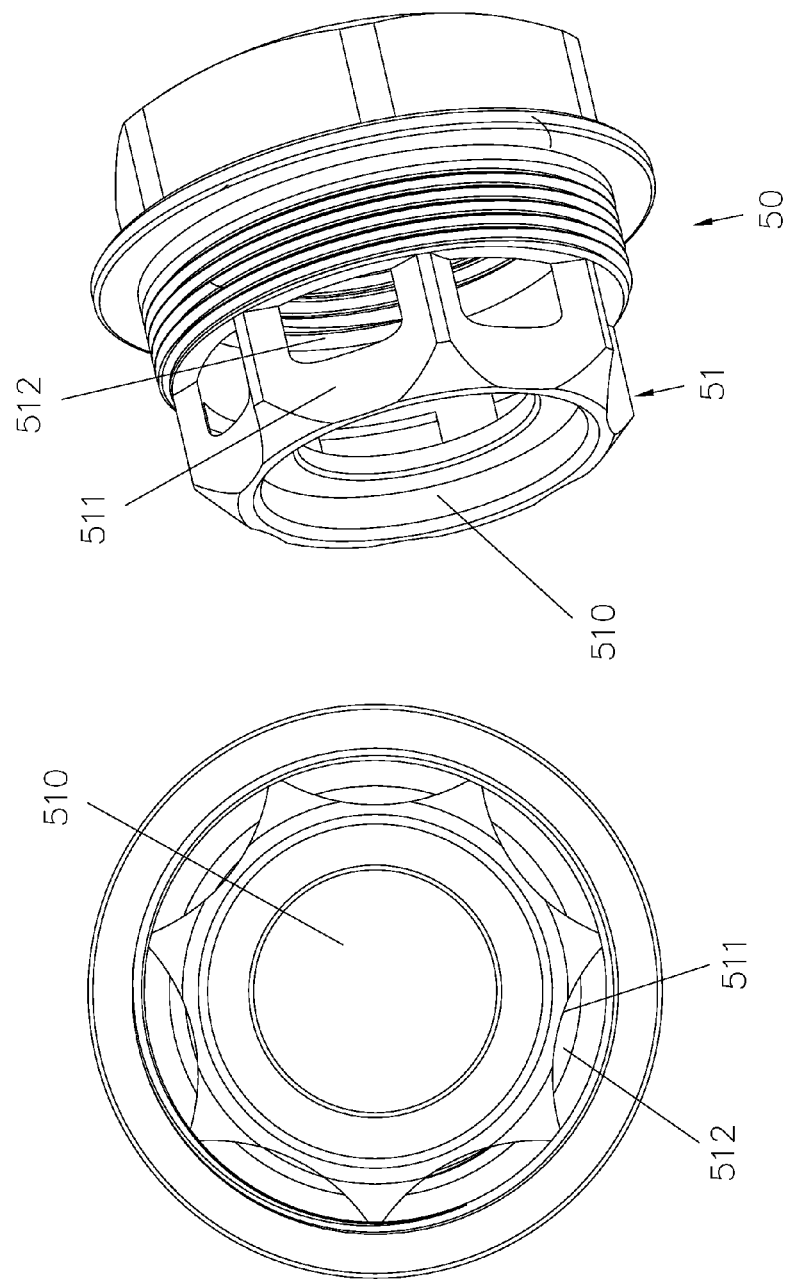
FIG. 6 is a perspective view and a plan view showing the assembly of an inlet connector of the monitor valve according to the first embodiment of the present invention.

With reference to FIG. 6, the inlet connector 50 is locked in the inlet channel 11 of the body 10 and includes a guiding portion 51 formed on one end of the inlet connector 50 and accommodated in the chamber 14 of the body 10, the inlet connector 50 also includes a second close ring 52 defined between the guiding portion 51 and the stop ball 40, wherein the guiding portion 51 has a central passage 510 formed therein and has plural arcuate passages 511 arranged around a heptagon peripheral side of the guiding portion 51, and wherein each passage 511 has an inlet 512 formed thereon. In this embodiment, seven passages 511 are isometrically arranged around the heptagon peripheral side of the guiding portion 51.

The transmission device 20 includes a handle bar 21, a positioning set 22, a disc 23, and a control shaft 24.

The control shaft 24 is rotatably fixed in the first hole 17 of the body 10 and has an extension 240 and a bolt 241 formed on one end of the extension 240 and mounted in the recess 44 of the stop ball 40, wherein the extension 240 extends out of the body 10.

The disc 23 is disposed on the body 10 and includes a through hole 230 defined therein to insert through the extension 240, the disc 23 also has at least three fixing portions 231 which are separated a radius distance from the through hole 230 and are spaced from one another, such that an angle between any two adjacent through holes 230 is 90 degrees, and each fixing portion 231 is a notch or a hole which passes through the disc 23.

The handle bar 21 has a coupling segment 210 and a griping segment 211, and the coupling segment 210 has an affix orifice 2100 and has a limiting orifice 2101 defined between the affix orifice 2100 and the griping segment 211 to insert through the extension 240 of the control shaft 24, wherein the limiting orifice 2101 has a first plane 2102, and the control shaft 24 has a second plane 2400, such that a second screw nut 25 of the transmission device 20 is screwed with the extension 240 of the control shaft 24 via the handle bar 21, and the handle bar 21 drives the control shaft 24 to rotate.

The positioning set 22 is secured between the affix orifice 2100 of the handle bar 21 and one of the at least three fixing portions 231, the positioning set 22 includes a spring holder 220, a resilient element 221, and a rolling ball 222, wherein the spring holder 220 is disposed in the affix orifice 2100 and accommodates the resilient element 221 which abuts against the rolling ball 222, such that the rolling ball 222 is partially accommodated in and is biased against the one of the at least three fixing portions 231.

Figure 4:
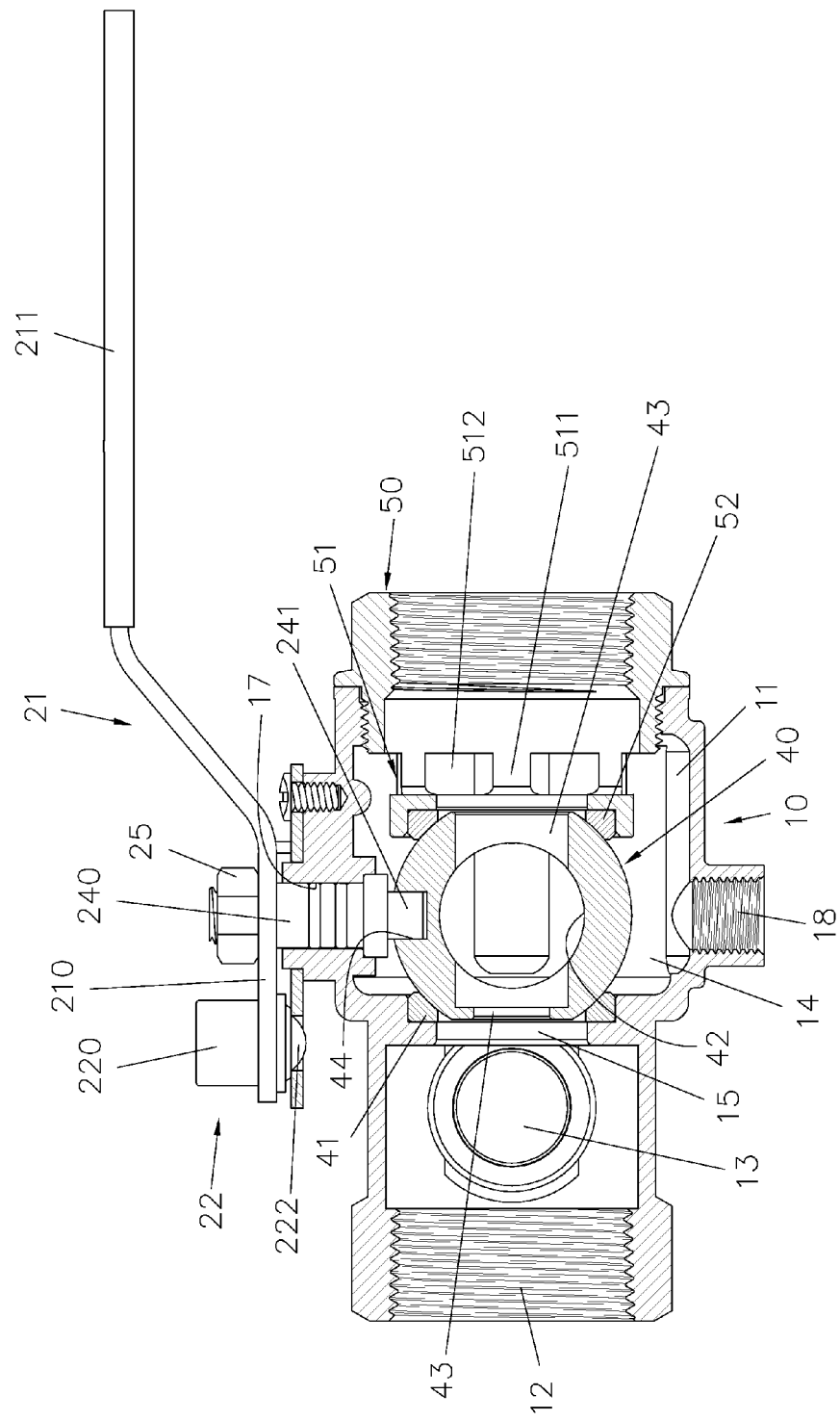
FIG. 4 is a cross sectional view taken along the line 4-4 of FIG. 1.
Figure 7:
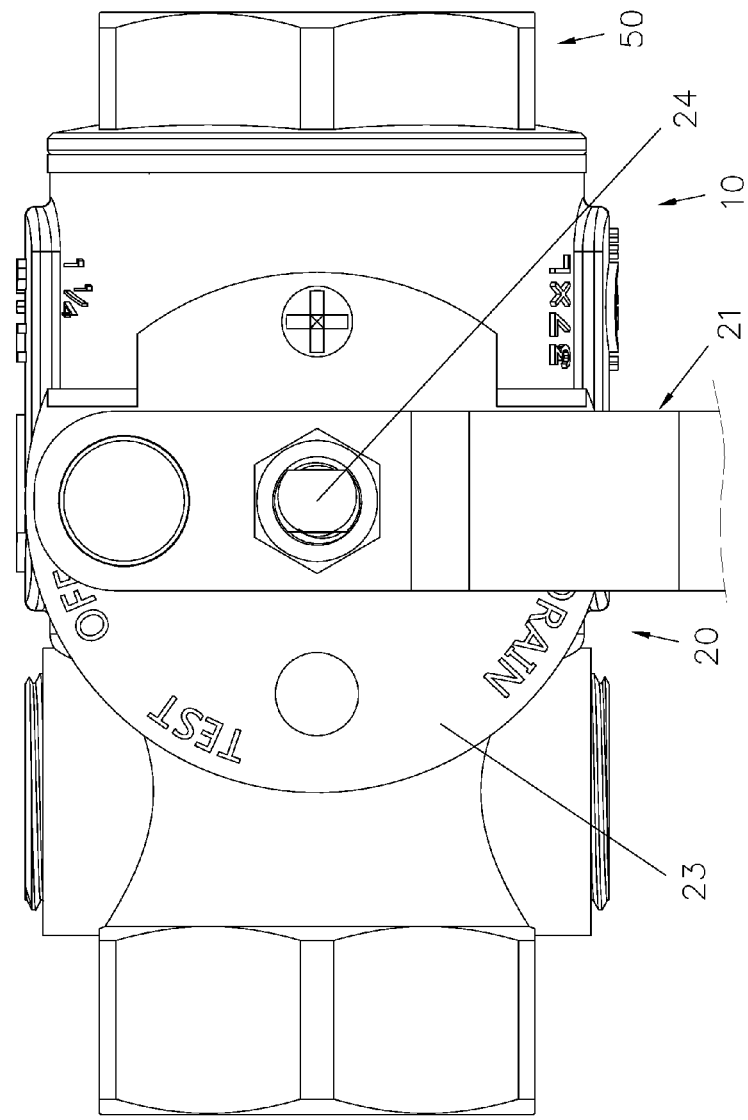
FIG. 7 is a plan view showing the operation of a neck opening of the monitor valve according to the first embodiment of the present invention.
Figure 8:
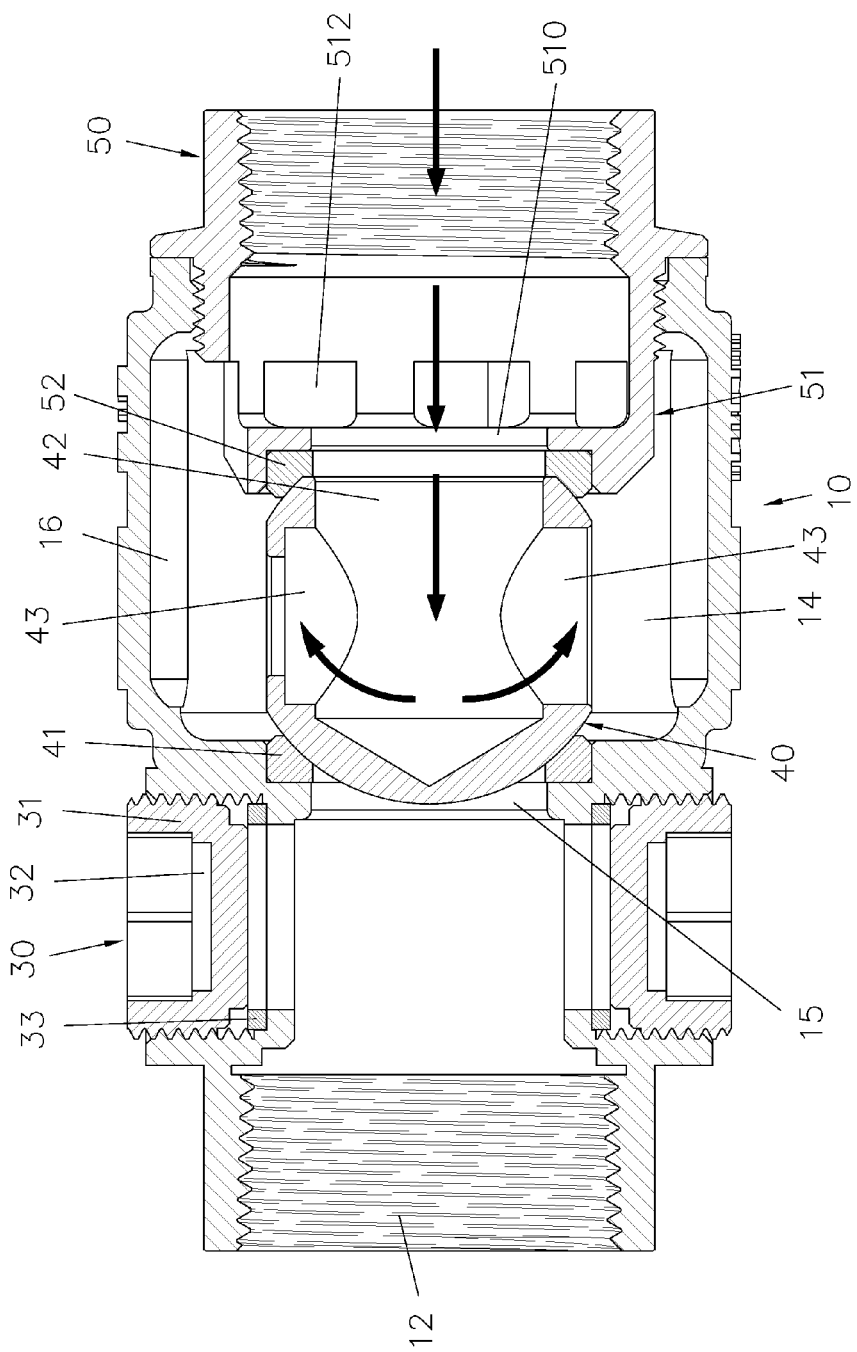
FIG. 8 is a cross sectional view of FIG. 7.

As illustrated in FIG. 4, when the neck opening 15 is closed and the griping segment 211 of the handle bar 21 is rotated to drive the control shaft 24 via the limiting orifice 2101, the rolling ball 222 of the positioning set 22 is driven by the control shaft 24 to move away from the one of the at least three fixing portions 231 and to be limited by the disc 23, such that the rolling ball 222 presses the resilient element 221. Referring further to FIGS. 7 and 8, when the handle bar 21 is moved to close the neck opening 15 at an OFF position on the disc 23, the positioning set 22 moves to correspond to the one of the at least three fixing portions 231, and the rolling ball 222 is pushed by the resilient element 221 to abut against the one of the at least three fixing portions 231, then the rolling ball 222 is located at the OFF position on the disc 23, thereafter the first aperture 42 of the stop ball 40 corresponds to the central passage 510 of the inlet connector 50, the two second apertures 43 correspond to the body 10, hence the stop ball 40 closes the neck opening 15 of the body 10.

Figure 9:
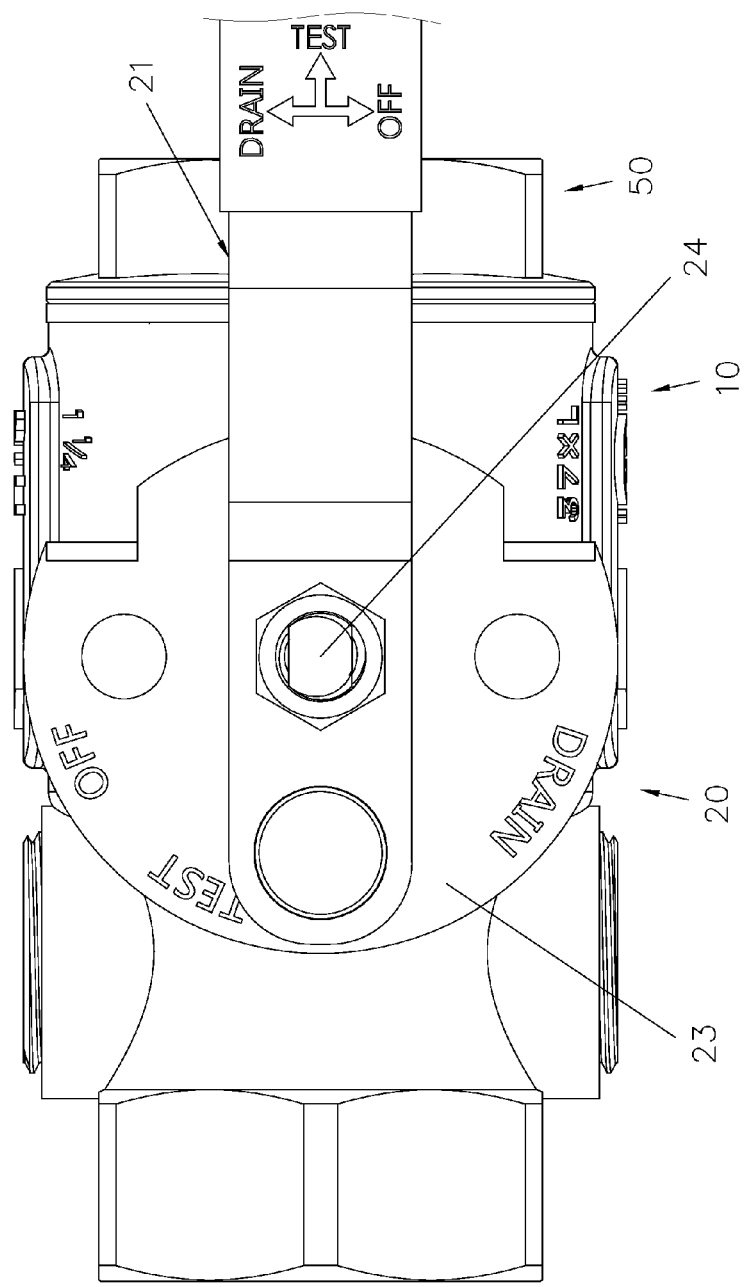
FIG. 9 is a plan view showing the operation of the monitor valve according to the first embodiment of the present invention.
Figure 10:
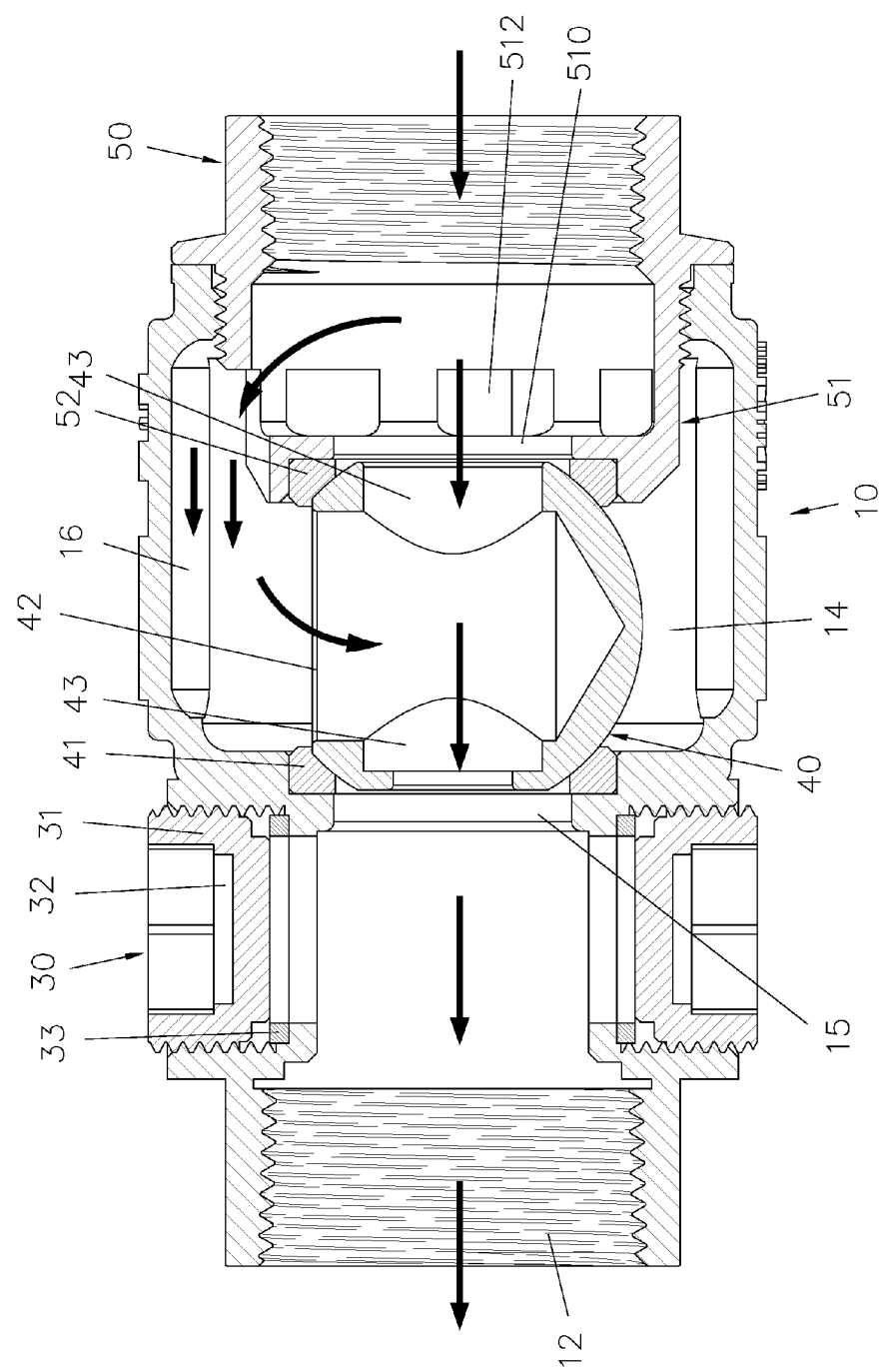
FIG. 10 is a cross sectional view of FIG. 9.

With reference to FIGS. 9 and 10, when the handle bar 21 is rotated to a TEST position on the disc 23, the first aperture 42 of the stop ball 40 corresponds to the chamber 14 of the body 10, the two second apertures 43 correspond to the neck opening 15 and the central passage 510 of the inlet connector 50, such that when the fluid flows into the guiding portion 51 from the inlet connector 50, a part of the fluid further flows into the neck opening 15 through the two second apertures 43 of the stop ball 40 and flows out of the outlet channel 12 via the at least one orifice 13, hence the part of the fluid flows out of the outlet channel 12 via the inlet 512 of each passage 511 of the guiding portion 51, the plurality of trenches 16 of the chamber 14, an outer rim of the stop ball 40, the two second apertures 43 which correspond to the neck opening 15, the neck opening 15, and the at least one orifice 13 to buffer fluid pressure and to guide the fluid, thus lowering flowing noises.

Figure 11:
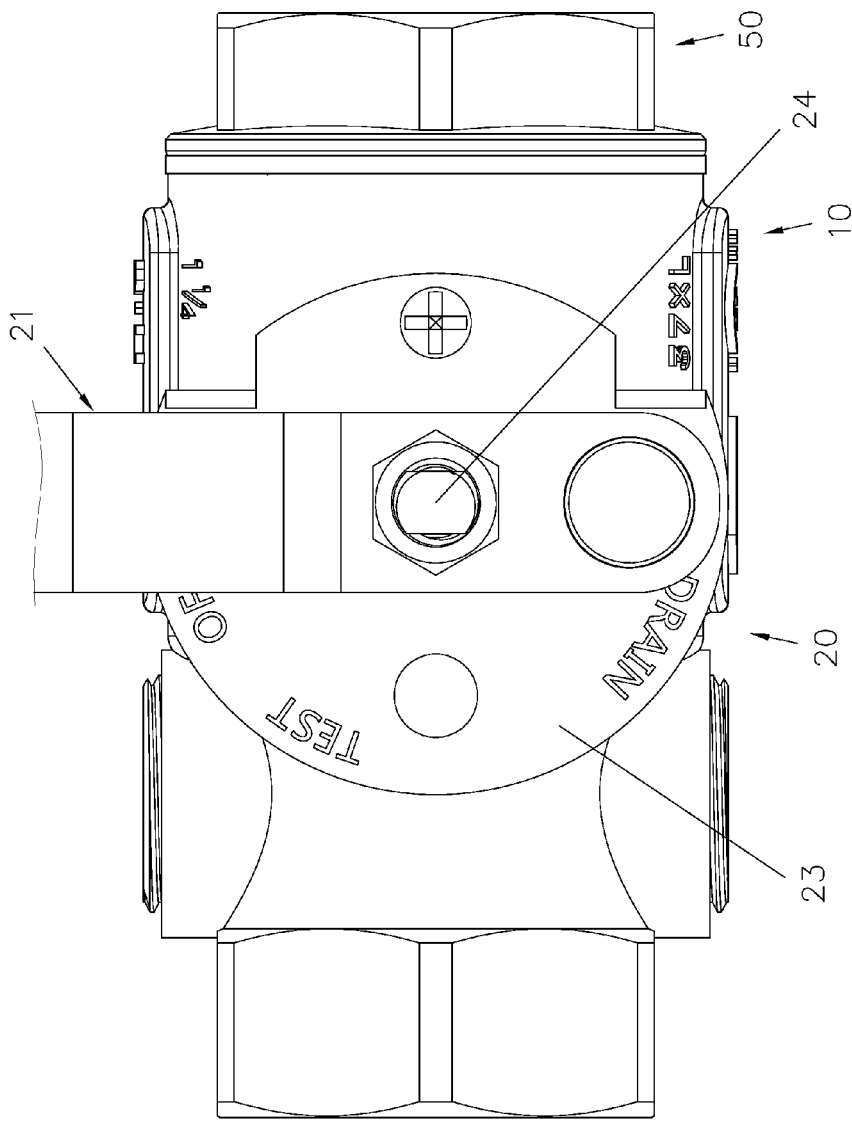
FIG. 11 is another plan view showing the operation of the neck opening of the monitor valve according to the first embodiment of the present invention.
Figure 12:
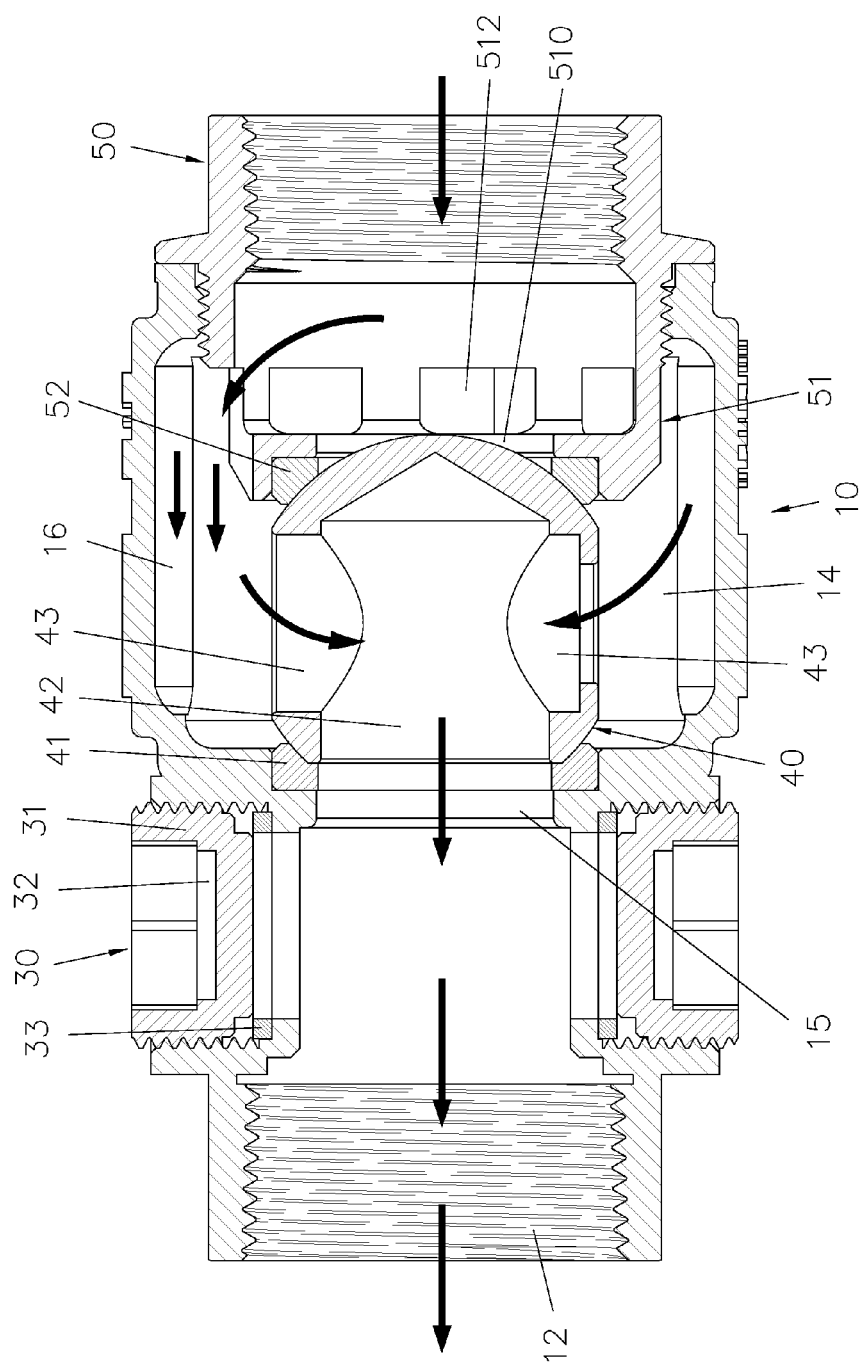
FIG. 12 is a cross sectional view of FIG. 11.

As shown in FIGS. 11 and 12, when the handle bar 21 is rotated to a DRAIN position on the disc 23, the first aperture 42 of the stop ball 40 corresponds to the neck opening 15, and the two second apertures 43 are located on two sides of the chamber 14, the stop ball 40 closes the central passage 510 of the inlet connector 50, such that the fluids flows out of the outlet channel 12 through the inlet 512 of each passage 511 of the guiding portion 51, the plurality of trenches 16 of the chamber 14, the two second apertures 43, and the first aperture 42. Thereby, the stop ball 40 closes the central passage 510 of the inlet connector 50 to slow a flowing speed of the fluid, and the inlet 512 of each passage 511 guides the fluid to flows out of the outlet channel 12 through the plurality of trenches 16 of the chamber 14, the two second apertures 43, the first aperture 42, the neck opening 15, and the at least one orifice 13, thus flowing the fluid smoothly at a large flow and lowering flowing noises.

Figure 13:
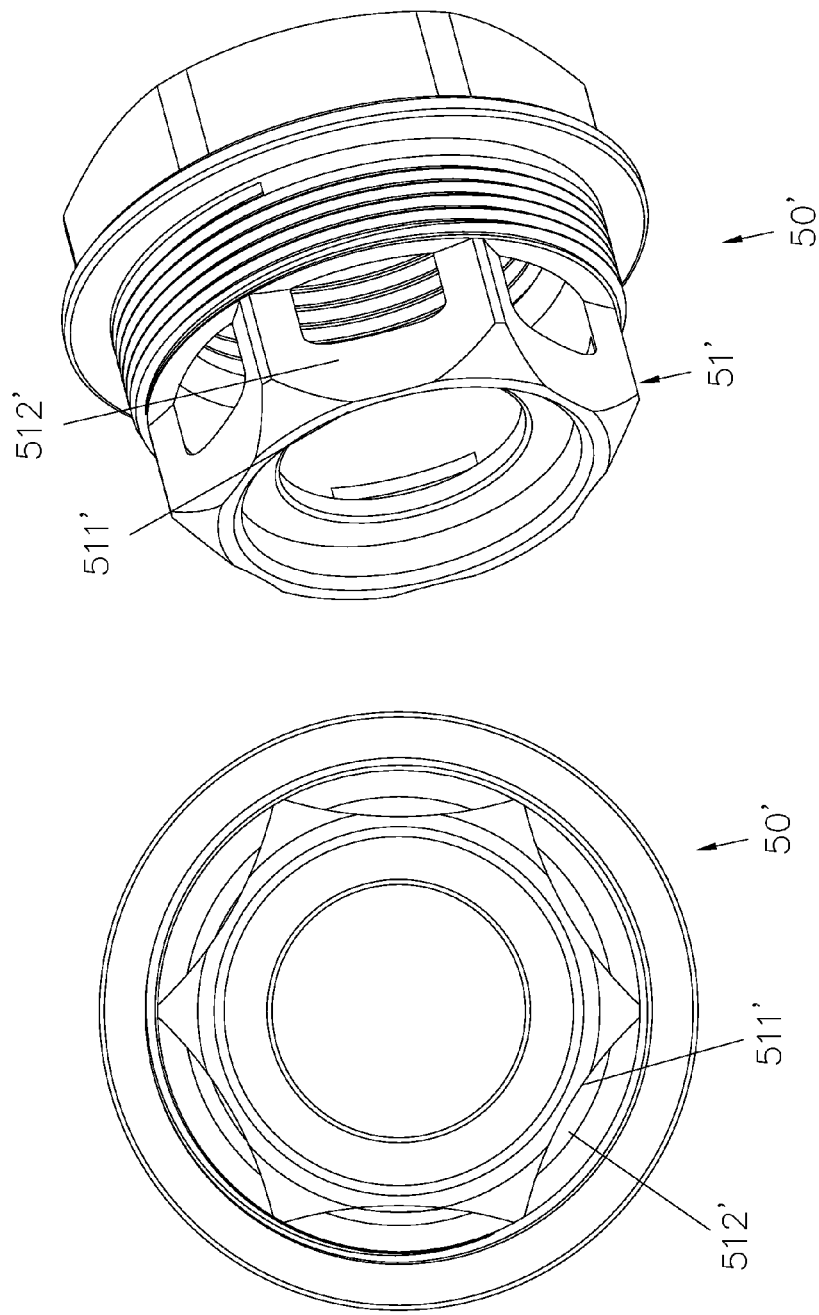
FIG. 13 is a perspective view and a plan view showing the assembly of an inlet connector of a monitor valve according to a second embodiment of the present invention.

Referring to FIG. 13, a difference of a monitor valve of a second embodiment from that of the first embodiment comprises: six passages 511' isometrically arranged around a hexagonal peripheral side of a guiding portion 51', and each passage 511' has an inlet 512' formed thereon.

Figure 14:
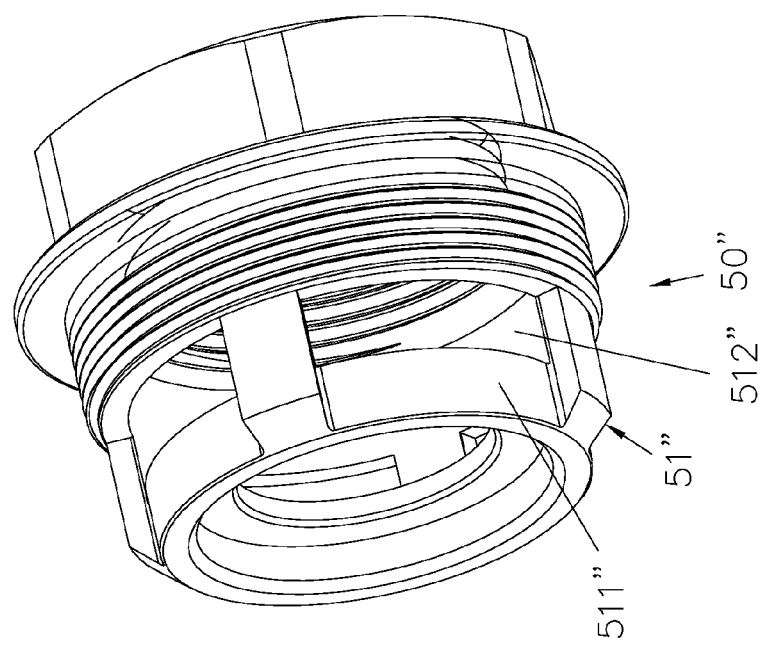
FIG. 14 is a perspective view and a plan view showing the assembly of an inlet connector of a monitor valve according to a third embodiment of the present invention.
Figure 14:
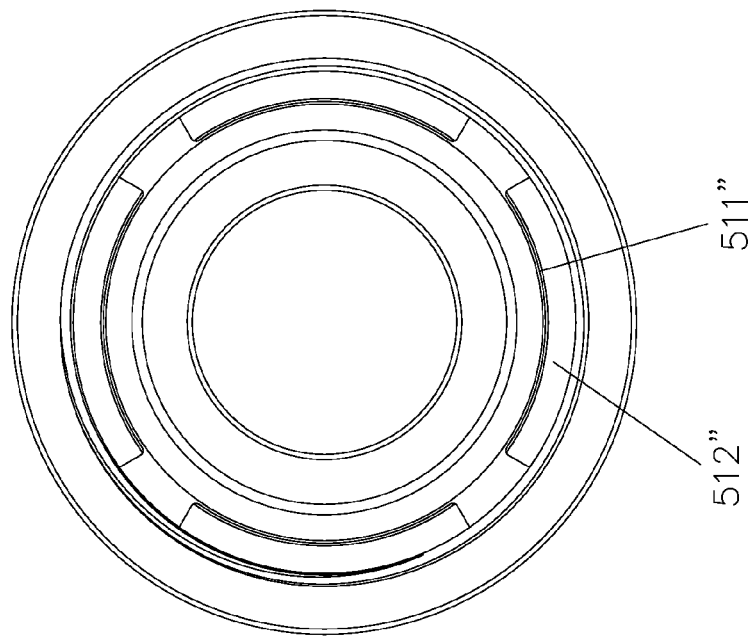

Referring to FIG. 14, a difference of a monitor valve of a third embodiment from that of the first embodiment comprises: four rectangular passages 511" isometrically arranged around a peripheral side of a guiding portion 51", and each passage 511" has an inlet 512" formed thereon.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A monitor valve comprising:
a body being hollow and including an inlet channel defined on a first end thereof, an outlet channel formed on a second end thereof, at least one orifice arranged on at least one side thereof adjacent to the outlet channel, a chamber defined between the at least one orifice and the inlet channel, a neck opening defined between the chamber and the at least one orifice, a plurality of trenches arranged around a peripheral side of the chamber, and a first hole formed on the body opposite to the chamber;
at least one monitoring assembly mounted in the at least one orifice of the body;
a stop ball accommodated in the chamber of the body and including a first close ring disposed between the stop ball and the neck opening, and a first aperture and two second apertures which are formed on three positions of the stop ball, wherein the first aperture is in communication with and is perpendicular to the two second apertures;
an inlet connector locked in the inlet channel of the body and including a guiding portion formed on one end of the inlet connector and accommodated in the chamber of the body, the inlet connector also including a second close ring defined between the guiding portion and the stop ball, wherein the guiding portion has a central passage formed therein and has plural passages arranged around a peripheral side of the guiding portion, and wherein each passage has an inlet formed thereon;
a transmission device rotatably fixed in the first hole of the body to control the stop ball to rotate.

2. The monitor valve as claimed in claim 1, wherein each monitoring assembly includes a first screw nut screwing with each of the at least one orifice and includes a window fixed in the first screw nut of the body.

3. The monitor valve as claimed in claim 2, wherein each monitoring assembly also includes a closing washer fixed between each of the two orifices and the first screw nut.

4. The monitor valve as claimed in claim 1, wherein two orifices are arranged on two sides of the body adjacent to the outlet channel.

5. The monitor valve as claimed in claim 4, wherein each monitoring assembly includes a first screw nut screwing with each of the at least one orifice and includes a window fixed in the first screw nut of the body.

6. The monitor valve as claimed in claim 5, wherein each monitoring assembly also includes a closing washer fixed between each of the two orifices and the first screw nut.

7. The monitor valve as claimed in claim 1, wherein two diameters of the two second apertures are different.

8. The monitor valve as claimed in claim 1, wherein the stop ball also includes a recess defined thereon to correspond to the first hole, and the transmission device includes a handle bar, a disc, and a control shaft, wherein the control shaft is rotatably fixed in the first hole of the body and has an extension and a bolt formed on one end of the extension and mounted in the recess of the stop ball, and the extension extends out of the body; the disc is disposed on the body and includes a through hole defined therein to insert through the extension; the handle bar is placed on the disc and has a coupling segment and a griping segment, wherein the coupling segment has a limiting orifice, and the extension of the control shaft inserts through limiting orifice of the handle bar and the through hole of the disc, and the extension is connected with the handle bar, such that the handle bar drives the control shaft to rotate.

9. The monitor valve as claimed in claim 8, wherein the transmission device further includes a positioning set, and the disc also has at least three fixing portions which are separated a radius distance from the through hole and are spaced from one another, and each fixing portion is a notch or a hole, the coupling segment of the handle bar has an affix orifice, wherein the positioning set is secured between the affix orifice of the handle bar and one of the at least three fixing portions, and the positioning set has a spring holder, a resilient element, and a rolling ball, wherein the spring holder is disposed in the affix orifice and accommodates the resilient element which abuts against the rolling ball, such that the rolling ball is partially accommodated in and is biased against the one of the at least three fixing portions.

10. The monitor valve as claimed in claim 8, wherein a second screw nut of the transmission device is screwed with the extension of the control shaft via the handle bar.

11. The monitor valve as claimed in claim 1, wherein the guiding portion has seven or five passages isometrically arranged around the peripheral side thereof.

12. The monitor valve as claimed in claim 11, wherein each passage is arcuate or rectangular.

13. The monitor valve as claimed in claim 1, wherein each passage is arcuate or rectangular.

* * * * *